United States Patent [19]

Bohle

[11] Patent Number: 4,667,790

[45] Date of Patent: May 26, 1987

[54] GEARING UNITS

[75] Inventor: Werner Bohle, Lüdinghausen, Fed. Rep. of Germany

[73] Assignee: Gewerkschaft Eisenhutte Westfalia, Lunen, Fed. Rep. of Germany

[21] Appl. No.: 754,341

[22] Filed: Jul. 11, 1985

[30] Foreign Application Priority Data

Jul. 12, 1984 [DE] Fed. Rep. of Germany ....... 3425638

[51] Int. Cl.$^4$ ..................... F16D 7/02; F16D 43/286
[52] U.S. Cl. ................................. 192/56 F; 192/150
[58] Field of Search .................. 192/56 R, 150, 56 F

[56] References Cited

U.S. PATENT DOCUMENTS

| 2,973,067 | 2/1961 | Eddy, Jr. | 192/56 R X |
| 3,245,285 | 4/1966 | Van Den Kieboom | 192/150 X |
| 3,828,900 | 8/1974 | Anderson | 192/150 X |
| 4,245,526 | 1/1981 | Frain et al. | 192/150 X |
| 4,601,218 | 7/1986 | Bohle | 192/56 F X |

FOREIGN PATENT DOCUMENTS

| 2088442 | 6/1982 | United Kingdom . | |
| 2133105 | 7/1984 | United Kingdom | 192/56 F |

Primary Examiner—Rodney H. Bonck
Assistant Examiner—Richard M. Lorence
Attorney, Agent, or Firm—Samuels, Gauthier, Stevens & Kehoe

[57] ABSTRACT

A gearing unit has a housing containing gearing drivably interconnecting a rotary input to an output shaft used to propel a drive chain of a mineral mining machine. A clutch is provided which is released by hydraulic pressure to disengage the drive automatically should excessive loading occur. A spigot rotatably locked to the shaft provides a fluid passage for hydraulic fluid used to release the clutch and the fluid flow is controlled by an electromagnetic valve. A torsion bar carrying a load sensor is located within the spigot and the sensor provides an electrical signal transferred to control means for operating the valve via a slip-ring system. The torsion bar is rotatably locked to the shaft via a coupling rod disposed within the shaft and a push-in connection. The torsion bar is also rotatably secured to the spigot for easy release therefrom. Access to the bar from outside the housing is facilitated and by releasing at least the connection between the spigot and the bar, the latter can be withdrawn axially while leaving the other components intact.

21 Claims, 3 Drawing Figures

GEARING UNITS

FIELD OF THE INVENTION

The present invention relates to a gearing unit particularly intended for use with chain driven mining machinery. More particularly, the invention relates to a gearing unit which emloys overload protection means which operates automatically to disengage the drive therethrough in the event of an overload.

BACKGROUND OF THE INVENTION

A known gearing unit described in GB No. 2088442 utilises, as a load sensor, a strain gauge in the gear train to provide a signal which indirectly operates a clutch to disengage the output from the input. The load sensor is mounted on an output shaft of the unit and if the sensor is damaged or needs replacement extensive disassembly work is necessary.

U.S. patent application Ser. No. 563,487 filed Dec. 20, 1983 and assigned to the same assignee as this application describes a gearing unit with a load sensor carried by a replaceable pin accessible exteriorly of the unit and engaged with the gearing so as to be subjected to the dynamic force transmitted therethrough.

A general object of the present invention is to provide an improved form of gearing unit.

SUMMARY OF THE INVENTION

A gearing unit constructed in accordance with the invention comprises a housing containing gearing for transmission of rotary drive, a releasable coupling in the housing for disengaging the drive, sensing means in the housing for providing an electrical signal indicative of load transmitted through the gearing, a control system for initiating release of the coupling to disengage the drive when the signal indicates an overload condition, elongate support means subjected to the torsion in a rotary component of the unit and serving to carry the sensing means and to cause variations in the signal dependent on the torsion, the support means or at least part thereof being mounted within said rotary component and means for detachably connecting the support means to the component for rotation therewith, the connecting means permitting the support means to be extracted from the rotary component when released.

The support means may take the form of a torsion bar or a multi-part shaft system disposed at least partly within an output shaft or a spigot forming an axial continuation of the output shaft and constituting the aforesaid rotary component. The load measuring element is thus reliably protected yet it can be inserted and removed easily and rapidly. The torsion bar experiences the same forces as the output shaft directly and the sensor carried thereby can thus provide a direct indication of dynamic loading. This is particularly useful where the shaft drives a chain via a sprocket wheel since the overload protection system can respond rapidly to an increased load to prevent fracture of the chain. If damage should occur to the sensor itself then the torsion bar can be released and withdrawn without extensive dismantling of the unit.

In a prferred construction the torsion bar is fitted inside a spigot piece rotatably locked to the shaft and providing a fluid passageway to a pressure chamber which releases a clutch serving as the coupling between the gearing and the output shaft. A coupling bar coaxial with the torsion bar extends within the output shaft and is detachably secured to the shaft remote from the torsion bar. A push-in type connection can link the bar to the coupling rod for rotation together but permits axial withdrawal of the bar. The bar is itself detachably secured to the spigot at the end remote from the coupling rod. By releasing the bar from the spigot it can thus be easily removed from the unit. A union can be provided which is simply fixed with screws to the spigot and by other means to the bar. Releasing the screws from the spigot allows the bar and the union to be removed together from the unit. In another construction a rotational cylindrical block is fixed to the bar and secured via screws and a plate to the spigot. A bearing housing mounts bearings between the bar and the housing and between the block and the housing. The housing, the block and the bar can be removed as an assembly from the housing of the unit.

A preferred form of securing means or connection adopted in the unit has a frusto-conical part engaged in a frusto-conical bore and a clamp screw which urges the part tightly into the bore to establish a non-rotatable joint therebetween. Preferably an amplifier is provided in the unit to amplify the sensor signal. The amplifier can be mounted to rotate with the torsion bar and a slip ring system can be used to transfer the amplified signal to a stationary cable connected to the control system.

The unit is advantageously constructed with a cover plate or the like which enables ready access to the torsion bar securing means when removed. By mounting the amplifier and slip rings to the bar directly or indirectly these items can be removed also with the bar. The torsion bar can itself be hollow and access to a draw spindle establishing connection between the bar and the coupling rod can be gained from inside the bar which can be opened to the exterior of the unit. The end region of the torsion bar adjacent the coupling rod may have a frusto-conical bore which receives a corresponding frusto-conical clamping member which can be urged into the bore by the draw spindle accessible from within the bar to cause the clamping member to expand the other end region of the torsion bar into clamping engagement with a sleeve mounted to the adjacent end of the coupling rod which receives the end region of the torsion bar.

The invention also provides a gearing unit comprising a housing containing gearing, an output shaft, a releasable coupling for drivably connecting the shaft to the gearing, a chamber for receiving pressure fluid which acts to release the coupling and disengage the drive to the shaft, a spigot fixed to the shaft to form an axial continuation thereof and having bores providing a fluid passage leading to the pressure chamber, an electromagnetic control valve which controls the flow of fluid to the chamber, a torsion bar disposed within the spigot, first means for detachably securing one end of the torsion bar remote from the shaft to the spigot, and second means for detachably securing another end of the torsion bar to the shaft, a load sensor carried by the torsion bar which provides an electrical signal dependent on the torsion in the shaft and control means which operates the valve in accordance with the signal to release the coupling in the event of overloading; wherein the torsion bar can be withdrawn from the unit after release of at least the first securing means.

The invention may be understood more readily, and various other features of the invention may become

BRIEF DESCRPTION OF DRAWINGS

Embodiments of the invention will now be described by way of examples only, with reference to the accompanying drawings, wherein.

DESCRIPTION OF PREFERRED EMBODIMENTS

Figure 1:
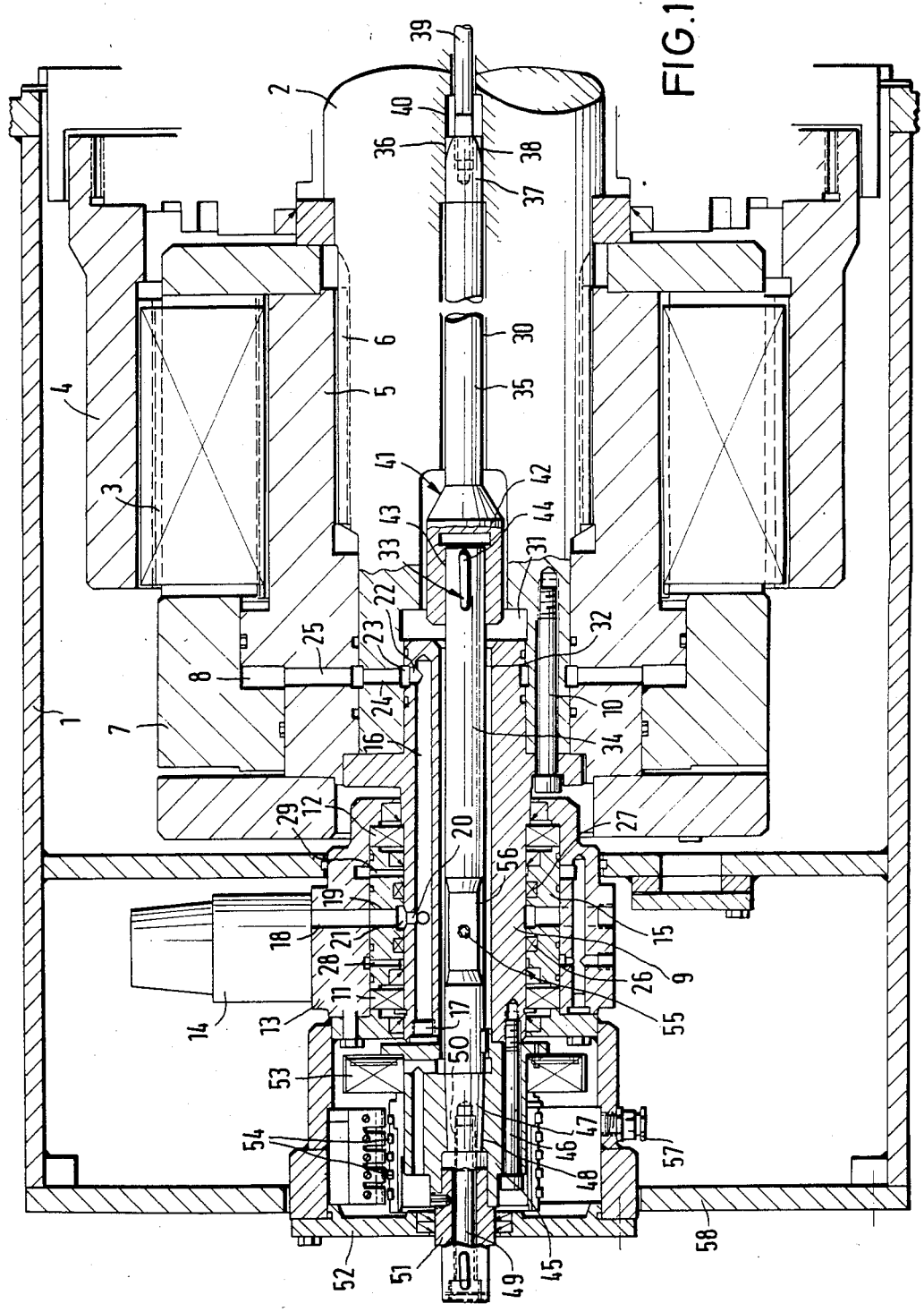
FIG. 1 is a schematic sectional side view of part of a gearing unit constructed in accordance with the invention.

FIG. 1 depicts part of a gearing unit which may be otherwise generally constructed as described in our U.S. patent application Ser. No. 563,487 filed Dec. 20, 1983, herein incorporated by reference. The gearing unit is particularly intended for chain drives and, more particularly is used for driving and haulage chain of mining machinery such as a coal plough. The gearing unit is composed of a housing containing gearing drivably interconnecting a rotary input and a rotary output. The part of the gearing unit shown in FIG. 1 is in the region of the output of the gearing and depicts overload protection means provided in this region. The housing of the unit is designated 1 and the output shaft of the gearing unit which may carry a sprocket wheel for driving a chain is designated 2. Mounted coaxially with the output shaft 2 there is a coupling 3 in the form of a multi-disc clutch. The clutch 3 is mounted within the housing 1. When the clutch 3 adopts one operative mode it permits the drive of the shaft 2 by way of the associated gearing (not shown) and in another operative mode, the clutch 3 disconnects the drive to the output shaft 2. The clutch 3 has alternate discs supported for rotation on respective inner and outer carrier rings 4, 5. The inner carrier 5 is connected by keying 6 with the shaft 2 to rotate therewith while the outer ring 4 is connected to the gearing. In known manner, the discs of the clutch 3 are held together by spring force, e.g. a stack of spring plates, and released hydraulically. Hydraulic pressure fluid for effecting clutch release is passed to a chamber 8 defined between the carrier 5 and an annular piston 7 and acts against the spring force to disengage the clutch discs. The carrier 5 is displaceably supported on the piston 7. Pressure fluid is conveyed to the chamber 8 by way of a rotary spigot 9 connected for rotation to the shaft 2 with the aid of screws 10. The spigot 9 effectively forms an axial extension of the shaft 2 inwardly of the housing 1 and is rotatably supported by bearings 11, 12 in a cylindrical sub-housing 13 rigidly fixed to the main housing 1.

An electro-magnetically operated control valve device 14 serves to control the flow of pressure fluid. The device 14 is mounted on the housing part 13. As is known from the aforementioned U.S. patent application Ser. No. 563,487, the arrangement is such that in the event of an overload the valve device 14 permits pressure fluid to flow to the chamber 8 via a fluid passageway defined by the various borings to effect disengagement of the clutch 3 and thereby to isolate the shaft 2 from the gearing and the rotary input.

The housing part 13 contains a stationary slide ring 15 which seals against the spigot 9. The spigot 9 contains a longitudinal bore 16 and a plug 17 closes off the bore 16 at the outer end of the spigot 9. Radial bores 20 lead from the bore 16 via mating peripheral grooves 21 in the spigot and the ring 15 to radial bores 18, 19 in the ring 15 and the housing part 13 to permit fluid to pass to the bore 16 from the valve device 14. The spigot 9 is sealed with respect to the fixed sliding ring 15 by means of high-pressure seals 26, 27 and any leakage of hydraulic fluid is evacuated by leakage channels 28, 29. The inner end region of the spigot 9 fits within a recess 31 in the shaft 2 and a flange of the spigot 9 abuts the end of the shaft 2 and carries the screws 10. At this inner end region the spigot 9 has a further radial bore 22 which leads via mating peripheral grooves 23 in the exterior of the spigot 9 and the interior of the recess 31, a radial bore 24 in the shaft 2 and grooves between the carrier 5 and the shaft 2 to a radial bore 25 in the carrier 5 and thence to the pressure chamber 8.

The shaft 2 has a stpped central axial bore 30 leading to the recess 31 which receives the spigot 9. The spigot 9 is likewise provided with a central bore 32 and the bores 30, 32 accommodate load sensing carrier means 33. The load sensing means 33 employs a two-part torsional means, namely a torsion bar 34, and a coupling rod 35, accommodated in the bores 32, 30. The coupling rod 35 is locked to the shaft 2 by means of a connection 36. More particularly a frusto-conical end portion 37 of the rod 35 engages in a fursto-conical bore 38 forming a continuation of the bore 30. A clamping screw 39 introduced into the bore 38 from the outer end of the shaft 2 engages with an axial threaded bore 40 in the end portion 37 of the rod 35. By tightening the screw 39 the end portion 37 is drawn into the bore 38 to reliably lock the rod 35 to the shaft 2. The adjacent end regions of the bar 34 and the rod 35 are interconnected via a plug-in releaseable type connection 41 which enables these components 34, 35 to be easily disconnected from one another but ensures that these components are reliably locked together for rotation. The connection 41 employs a sleeve 42 fixed to the end of the rod 35. The sleeve 42 has an axial bore 43 in which the bar 34 is received and interengaging axial projections e.g. splines or keys, and recesses 44 between the bore 43 and the bar 34 lock the sleeve 42 to the bar 34 for rotation while permitting their axial separation. The connection 41 between the sleeve 42 and the bar 34 can take various other forms, for example, a series of axial teeth can be provided on the end of the rod 34 which engages within a corresponding system of teeth within the bore 43 in the sleeve 42. Another arrangement would be for the end of the rod 34 to be made polygonal in cross-section to engage within a correspondingly-shaped polygonal boring 43 in the sleeve 42.

The bar 34 extends through the spigot 9 and the outer end of the spigot 9 carries a union 45 fitted to the spigot 9 by means of axial screws 46. The union 45 is also connected with the bar 34 as described hereinafter and serves to secure detachably the end of the bar 34 to the spigot 9. A frusto-conical end portion 47 of the bar 34 engages within a frusto-conical bore 48 in the union 45. An axial clamping screw 49 engages within an axial threaded bore 50 in the bar end portion 47 and serves to clamp the end portion 47 in the bore 48. The screw 49 also engages through a bore within a rotary member 51 which is thus connected to the union 45 for rotation therewith. The member 51 extends through a cover plate 52 fixed to the housing 1 and serves to drive a measuring device of the type known per se which indicates the distance through which the machine driven by the chain propelled by the shaft 2 moves. The screw 49 is accessible via the member 51 from outside of the gearing unit.

The torsion bar 34 and the coupling rod 35 are effectively linked to both ends of the shaft 2 and experience the same torsional loads. The torsion bar 34 has a recess 56 which carries load sensor such as a strain gauge 55 providing a signal dependent on the torsional loading. This signal is amplified by an amplifier 53 connected to the load sensor 55 by appropriate wiring (not shown). The amplifier is mounted on the union 45 for rotation with the system 9, 34, 35, 2, together with slip rings 54 which engage with stationary sliding contacts. As the shaft 2 is subjected to torsional loading during use, the sensor 55 provides a dependent electrical signal signifying the torsional stress on the shaft 2. The signal is amplified, taken off from the sliding contacts resting against the rotating slip rings 54 and conveyed via a cable extending through a connector 57 to an electronic control system (not shown). In the event of the detection of an overload the control system serves to actuate the valve device 14 automatically to cause pressure fluid to flow to the chamber 8 to release the clutch 3. The electronic control system can also be mounted in a protected position within a compartment in the main housing 1.

In order to dismantle the bar 34, all that is necessary is to remove the cover plate 52 and release the screws 46 between the union 45 and the spigot 9. The bar 34 can then be withdrawn together with the union 45 from the axial bore of the spigot 9 and from the sleeve 42. The rod 35 would remain in position. By releasing the screw 49, the bar 34 can be separated from the union 45 to permit repair or replacement.

In the installed position the torsion link 33 and associated parts are all protected within the main drive output shaft 2 and the spigot 9 which is connected thereto to form effectively an integral extension part of the latter.

Figure 2:
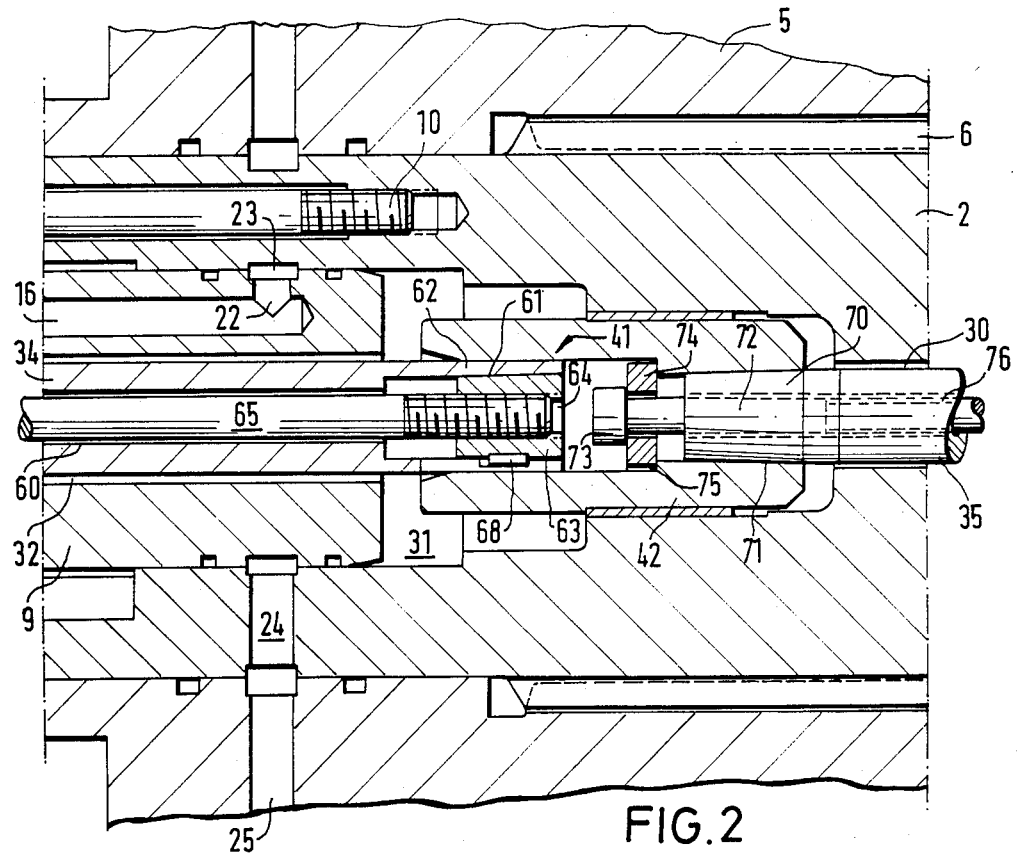
FIG. 2 is a sectional side view of part of the gearing unit showing a modified construction, the view being taken on a somewhat larger scale.
Figure 3:
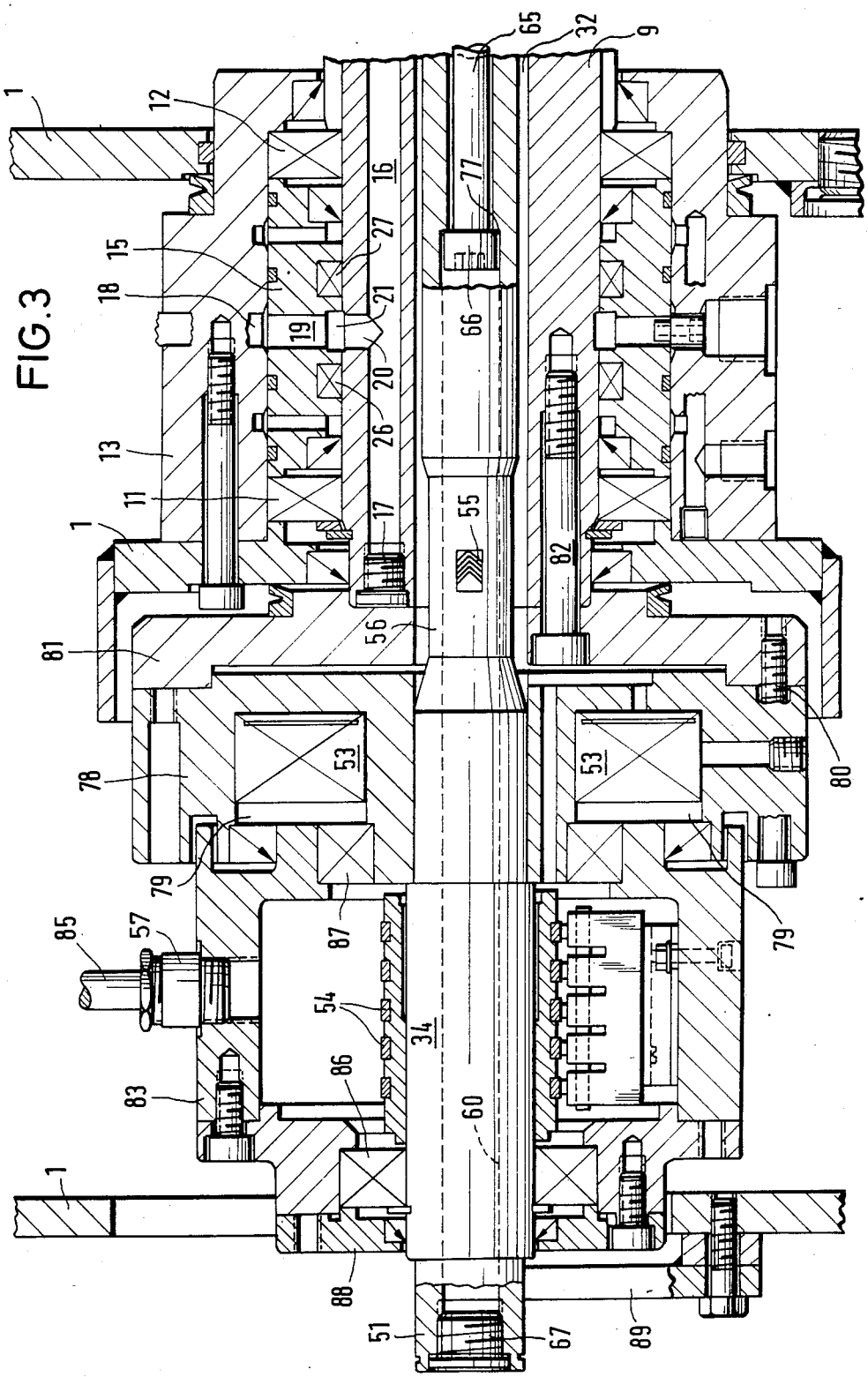
FIG. 3 is a schematic sectional side view of another part of the modified construction shown in FIG. 2.

FIGS. 2 and 3 are cross-sectional representations of alternative constructions for the gearing unit shown in FIG. 1 with like parts marked with the same reference numerals. FIG. 2 depicts on a somewhat larger scale an alternative coupling 41 between the bar 34 and the rod 35. In this arrangement the bar 34 has a central continuous bore 60 and the end region 62 of th bar 34 which engages in the sleeve 42 fixed to the rod 35 is expandible. The end region 62 has a frusto-conical interior 61 which contains an internal frusto-conical wedging member 63. The end region 62 can be spread out radially to effect expansion sufficient to grip the interior of the sleeve 42. The member 63 is secured in place by means of a tongue and a groove joint 68 between the member 63 and the sleeve 42 which establishes rotatable connection but allows axial displacement. A clamp screw 65 forming a draw spindle is screwed into a threaded bore 64 in the member 63. The screw 65 extends through the bore 60 in the bar 34. As shown in FIG. 3, the clamp screw 65 has a head 66 supported by a shoulder 77 of the bore 60. To clamp the bar 34 to the sleeve 42 a spanner is simply introduced into the bore 60 from the outer end 67 (FIG. 3) of the bar 34. As the screw 65 is tightened up the member 63 is drawn into the expandible end region 62 of the bar 34 and as a result the end region 62 spreads out radially and clamps against the inner wall of the sleeve 42. FIG. 2 also shows the sleeve 42 to be detachably fitted to the rod 35. In this case the inner end of the rod 35 also has a frusto-conical end region 70 engaging within a frusto-conical bore 71 in the sleeve 42. A clamping screw 72 has its head 73 engaging via a disc or washer against a shoulder 75 of the sleeve 42. The screw 72 engages within a threaded bore 76 in the rod 35 and when the screw 72 is tightened the end region 70 of the rod 35 is drawn into the bore 71 to provide a non-rotary connection between the sleeve 42 and the rod 35. The rod 35 is connected in a non-rotatable manner at its outer end with the shaft 2 and this can be accomplished in the manner shown in FIG. 1 or by other means.

FIG. 3 depicts an extension of the arrangement shown in FIG. 2 at the side opposite the output shaft 2. It may be seen that the bar 34 is fitted to a flanged cylindrical block 78 over a region projecting from the spigot 9. The block 78 is fixed non-rotatably with the bar 34 by way of an appropriate joint or connection. The block 78 supports the amplifier 53 which is protected within a compartment 79 in the block 78. The block 78 is connected by means of axial screws 80 to a plate 81 itself connected by screws 82 to the end of the spigot 9. The block 78 thus additionally connects the bar 34 to the spigot 9 and thus to the shaft 2.

At the side of the block 78, there is a bearing sub-housing 83 through which the bar 34 passes. The sub-housing 83 accommodates the slip ring system composed of the slip rings 54 and sliding contacts. The sub-housing 83 has a connector 57 for accommodating an electrical cable 85 leading to the slip ring system 54, 54. The bar 34 is rotatably supported by a bearing 86 in the bearing housing 83 and a further rotary bearing 87 is disposed between the cylinder block 78 and the bearing housing 83. The stationary bearing housing 83 is closed off by a screwed-on cover plate 88. The member 51 which locates with the bar 34 extends outward through the cover plate 88 and has a reduced diameter relative to the bar 34. As mentioned the member 51 can drive a machine-distance-measurement device. A housing cover 89 is screwed onto the main gear housing 1 as shown. As also shown in FIG. 3, the block 78 which accommodates the amplifier 53 and the bearing housing 83 accommodating the slip ring system 55, 54 are effectively combined with the bar 34 to form a self-contained assembly. These components can thus be withdrawn and replaced together. The first operation involved in removal and replacement of this assembly is to release the clamp screw 65 by introducing a spanner through the bore 60 of the bar 34. The disengages the bar 34 from the rod 35 and hence from the shaft 2. The cover plate 89 is then removed, the cable 85 on the connection 84 is released and then screws 80 are released. This permits the assembly 78, 83, 34 to be removed for repair or replacement.

What is claimed is:

1. In a gearing unit for use in driving a mining machine and employing a housing containing a rotary drive member and a rotary component, a releasable coupling in the housing for disengaging the rotary drive member from the rotary component, sensing means in the housing for providing an electrical signal indicative of load transmitted through the rotary drive member, and a control device responsive to said electrical signal for initiating release of the coupling to disengage the rotary drive member from the rotary component when the signal indicates an overload condition; the improvement comprising elongate support means subjected to torsion in the rotary component of the unit and serving to carry the sensing means and to cause variations in the signal dependent on the torsion, the support means or at least part thereof being mounted within said rotary component, and means for detachably connecting the support means to the rotary component for rotation therewith, the connecting means permitting the release and extraction of the support means from the rotary component for withdrawal from the unit.

2. A gearing unit according to claim 1, wherein the sensing means is a strain gauge.

3. A gearing unit according to claim 1, wherein the rotary component is an output shaft.

4. A gearing unit according to claim 1, wherein the rotary component is a spigot rotatable with an output shaft and forming an axial extension thereof.

5. A gearing unit according to claim 1, wherein the support means comprises a torsion bar carrying the sensing means and there is further provided a coupling rod coaxial with the torsion bar and connection means detachably securing the coupling rod to the rotary component, said connection means being constituted by means detachably securing the torsion bar to the rotary component and means for locking adjacent ends of the torsion bar and the coupling rod together for common rotation with the rotary component, the locking means permitting easy axial separation between the torsion bar and coupling rod to release the bar.

6. A gearing unit according to claim 5, wherein the rotary component is a combination of an output shaft and a spigot mounted thereto, the coupling rod is disposed within the output shaft and detachably secured thereto with an associated securing mans at an end remote from the torsion bar, the torsion bar is disposed within the spigot and securing means associated with the torsion bar detachably secures an end of the torsion bar remote from the coupling rod to the spigot.

7. A gearing unit according to claim 6, wherein at least one of the securing and locking means employs a frustoconical bore receiving a correspondingly shaped frustoconical part and a releasable screw-threaded member for urging the part tightly into the bore.

8. A gearing according to claim 1, wherein the rotary component is an output shaft and a spigot, the spigot having bores forming a fluid passageway leading to a pressure chamber which serves to release the coupling when charged with pressure fluid.

9. A gearing according to claim 6, wherein the coupling is relased by admitting pressure fluid to a pressure chamber associated therewith and the spigot has bores which provide a passage through which the fluid flows to the chamber.

10. A gearing according to claim 6, wherein the securing means associated with the torsion bar employs a union receiving the torsion bar and fixed with screws to the spigot, the union also carrying slip rings for transferring the electrical signal from the sensing means.

11. A gearing unit according to claim 6, wherein the output shaft is provided with an axial bore containing the coupling rod and the associated securing means includes a screw-threaded member accessible from an outer end of the output shaft which engages with a screw-threaded bore in the coupling rod and serves to urge the rod against a shaped clamping surface of the shaft when tightened.

12. A gearing unit according to claim 6, wherein the torsion bar has a recess containing the sensing means, a frusto-conical end region which forms part of the associated securing means and another end region which is insertable in a sleeve at the adjacent end region of the coupling bar and forms part of the locking means.

13. A gearing unit according to claim 12, wherein the sleeve and other end region of the torsion bar have interengageable axial projections and recesses.

14. A gearing unit according to claim 12, wherein the other end region of the torsion bar has a frusto-conical bore which receives a corresponding frusto-conical clamping member which can be urged into the bore by a screw-threaded element accessible from within the bar to cause the clamping member to expand the other end region of the torsion bar into clamping engagement with the sleeve at the end region of the coupling rod.

15. A gearing unit according to claim 14, wherein the end region of the coupling rod is frusto-conical and engages in a frusto-conical bore in the associated sleeve, the end region being urged into the bore by a screw-threaded element to rotatably lock the sleeve to the coupling rod.

16. A gearing unit according to claim 6, wherein the torsion bar is fitted with a cylindrical flanged block which carries an amplifier which amplifies the signal from the sensing means, the block being detachably secured to the rotary component.

17. A gearing unit according to claim 16, wherein the torsion bar supports slip rings of a slip ring system for electrical connection to the amplifier which engages with stationary contacts for connection to a cable for conveying the amplified signal to the control device.

18. A gearing unit according to claim 17, wherein a stationary bearing housing is mounted alongside the block, bearings ar provided between the housing and the torsion bar as well as between the housing and the block, and the stationary contacts of the slip ring system are disposed in the bearing housing.

19. A gearing unit according to claim 6, wherein the torsion bar extends outwardly of a housing of the unit and supports a member for driving a distance measuring device.

20. A gearing unit according to claim 1, wherein the connection means includes a push-in axial coupling.

21. A gearing unit comprising a housing containing a rotary output member for the gearing unit, an output shaft, a releasable coupling for drivably connecting the shaft to the rotary output member, a chamber for receiving pressure fluid which acts to release the coupling, a spigot fixed to the shaft to form an axial continuation thereof and having bores providing a fluid passage leading to the pressure chamber, an electromagnetic control valve which controls the flow of fluid to the chamber, a torsion bar disposed within the spigot, first means for detachably securing one end of the torsion bar remote from the shaft to the spigot, second means for detachably securing another end of the torsion bar to the shaft, a load sensor carried by the torsion bar which provides an electrical signal dependent on torsion in the shaft, said valve being operable in response to said signal to release the coupling in event of overloading; wherein the torsion bar can be withdrawn from the unit after release of at least the first securing means.

* * * * *